UNITED STATES PATENT OFFICE.

OTTO ERNST, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

ORANGE-YELLOW AZO DYE AND PROCESS OF MAKING SAME.

SPECIFICATION forming part of Letters Patent No. 714,883, dated December 2, 1902.

Application filed September 4, 1902. Serial No. 122,119. (No specimens.)

*To all whom it may concern:*

Be it known that I, OTTO ERNST, Ph. D., a citizen of the Empire of Germany, residing at Höchst-on-the-Main, in the Empire of Germany, have invented certain new and useful Improvements in the Manufacture of an Orange-Yellow Monoazo Dyestuff Suitable for the Preparation of Lakes, of which the following is a specification.

This invention relates to the manufacture of a dyestuff by combining diazotized ortho-nitranilin-para-sulfonic acid with beta-naphthol. I have found that the azo dyestuff which may be thus obtained is highly suitable for the preparation of insoluble color-lakes fast to water, acid, lime, and light, being distinguished by these valuable properties, especially that of fastness to light, from the orange of corresponding shade used in the manufacture of lakes.

The monoazo dyestuff obtained by combining diazotized ortho-nitranilin-para-sulfonic acid with beta-naphthol is also highly suitable for the manufacture of lakes. The lakes obtained from this dyestuff are yellower than those obtained from the isomeric para-nitranilin-ortho-sulfonic acid dyestuff and are of greater fastness than the lakes hitherto obtained from other known azo dyestuffs of the same shade, such as brilliant orange, the azo dyestuff from diazotized anilin, and Schäffer's beta-naphthol sulfonic acid.

The manufacture of the new dyestuff is illustrated as follows: 1.2 kilos of ammonium ortho-nitranilin-para-sulfonate are diazotized in a dilute solution of hydrochloric acid by a nitrite, avoiding a considerable excess of hydrochloric acid. The diazo compound is then slowly run into a solution of 0.75 kilos of beta-naphthol in the equivalent quantity of soda-lye and 0.35 kilos of sodium carbonate.

The dyestuff obtained from ortho-nitranilin-para-sulfonic acid forms an orange precipitate of metallic luster. It is not easily soluble, but may be completely separated by adding common salt.

The new dyestuff from ortho-nitranilin sulfonic acid in form of a powder or paste is orange, having a yellow metallic luster. It is soluble in water, but not very easily. With alkaline earths and metallic salts the dyestuff forms intensely-colored orange lakes of a pure shade of remarkable fastness to light. Especially the said color-lakes are far superior to those obtained from azo dyestuffs of a similar shade.

Having now described my invention, what I claim is—

1. The herein-described manufacture of an orange-yellow monoazo dyestuff for the preparation of color-lakes, which consists in combining the diazo compound of ortho-nitranilin-para-sulfonic acid with beta-naphthol, substantially as set forth.

2. As a new product the orange-yellow monoazo dyestuff obtained as herein described, being, when dry, an orange-yellow to brick-red powder, soluble in water and forming according to the usual methods color-lakes of orange-yellow shades of remarkable fastness, especially to light.

In testimony that I claim the foregoing as my invention I have signed my name in presence of two subscribing witnesses.

OTTO ERNST.

Witnesses:
 ALFRED BRISBOIS,
 BERNHARD LEYDECKER.